United States Patent [19]

Fayolle

[11] 4,057,597
[45] Nov. 8, 1977

[54] BLOCK-TYPE ARYL COPOLYESTERS AND FILAMENTS BASED ON THESE COPOLYESTERS

[75] Inventor: Bernard Fayolle, Ecully, France

[73] Assignee: Rhone-Poulenc-Textile, Paris, France

[21] Appl. No.: 717,677

[22] Filed: Aug. 25, 1976

[30] Foreign Application Priority Data

Aug. 27, 1975 France ............................ 75.26737
June 8, 1976 France ............................ 76.17484

[51] Int. Cl.² ..................... C08L 67/00; B28B 3/20; D01D 5/12; D01F 11/00
[52] U.S. Cl. ............................. 260/860; 264/176 F; 264/210 F
[58] Field of Search ......................................... 260/860

[56] References Cited

U.S. PATENT DOCUMENTS

| 2,728,747 | 12/1955 | Aelony et al. ................. 260/78.3 |
| 3,917,743 | 11/1975 | Schroeder et al. ............. 260/860 |
| 3,957,905 | 5/1976 | Sumoto et al. ................ 260/860 |
| 3,968,183 | 7/1976 | Hayashi et al. ............... 260/860 |

FOREIGN PATENT DOCUMENTS

| 921,683 | 5/1947 | France. |
| 1,568,152 | 5/1969 | France. |

Primary Examiner—Murray Tillman
Assistant Examiner—T. DeBenedictis, Sr.
Attorney, Agent, or Firm—Stevens, Davis, Miller & Mosher

[57] ABSTRACT

Disclosed are block-type aryl copolyesters, the process for obtaining these as well as the filaments produced therefrom, and the process for obtaining such filaments.

The aryl copolyesters contain from 10 to 90% of recurring flexible units of the formula

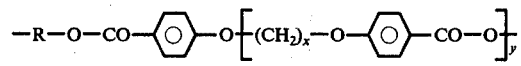

where R is an aliphatic, alicyclic or araliphatic radical, $x$ is an integer from 2 to 6, and $y = 0$ or 1, and from 90 to 10% of recurring rigid units of the formula

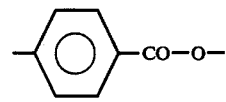

and have an inherent viscosity of at least 0.25.

The raw spun filaments produced therefrom possess a modulus of elasticity of at least 1,000 g/tex, and preferably at least 1,500 g/tex, and are obtained by melt-spinning at a temperature such that the copolyester is optically anisotropic at rest and in the relaxed state, followed by winding up the filament in a per se known manner. Such filaments can be used advantageously as reinforcing filaments.

8 Claims, No Drawings

BLOCK-TYPE ARYL COPOLYESTERS AND FILAMENTS BASED ON THESE COPOLYESTERS

The present invention relates to block-type aryl copolyesters containing recurrent rigid units and recurrent flexible units, a process for the preparation of the said copolyesters in spinnable and moldable form, as well as the filaments produced therefrom and a process for obtaining such filaments.

It is already known, according to U.S. Pat. No. 2,728,747, to prepare linear polyester resins by heating para-acetoxybenzoic acid in the presence of triphenyl phosphite. However, the polymers thus obtained have too low a molecular weight to allow them to be shaped either by spinning or by molding.

It is also known, according to French Pat. No. 1,568,152, to prepare spinnable and moldable polyesters, based on para-acetoxybenzoic acid, which have high molecular weights. However, such polymers ae highly crystalline and can only be molded at high temperatures, for example of the order of 440° C, and at molding pressures of the order of 280 kg/cm². Such conditions are obviously difficult to realize industrially and are therefore rather uneconomical.

The polyesters produced from p,p'-dicarboxydiphenoxy-alkanes and diols having from 2 to 10 carbon atoms, described in French Pat. No. 921,683, give shaped articles which have moduli of elasticity and flexural moduli which are insufficient for certain applications.

Spinnable and moldable block-type copolyesters have now been discovered, according to the present invention, that comprise from 10 to 90% of recurring flexible units of the formula

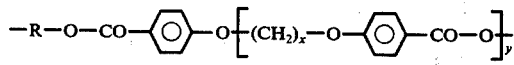

in which R is an aliphatic, alicyclic or araliphatic radical, x is an integer from 2 to 6, and y = 0 or 1, and from 90 to 10% of recurring rigid units of the formula

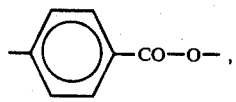

and which have an inherent viscosity of at least 0.25, measured on an 0.5% strength by weight solution in a 60–40 mixture of phenol and tetrachloroethane at 25° C.

Preferably, the block-type copolyesters according to the present invention comprise from 40 to 80% of recurring flexible units and from 60 to 20% of recurring rigid units, and the preferred copolyesters are those wherein R is an aliphatic radical containing two carbon atoms, and if $y = 1$, $x$ is preferably an even number.

The present invention also relates to a process for obtaining the said block-type copolyesters, characterized in that a. first, a polyether-ester is prepared which has a recurring unit of the formula

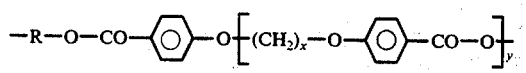

in which R is an aliphatic, alicyclic, or aralphatic radical, x is an integer from 2 to 6, and y is 0 or 1, by reaction of a compound of the formula (1)

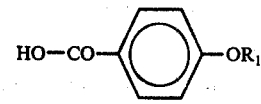

in which $R_1$ is a $-CH_2-CH_2-OH$ group, or a

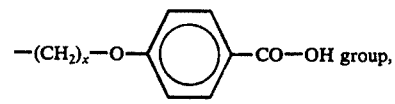

x being an integer from 2 to 6, or alkyl esters thereof, and, if desired, an aliphatic, alicyclic or araliphatic diol, the said polyether-ester having an inherent viscosity of at least 0.2, and b. the polyether-ester thus obtained is reacted, in the molten phase, with p-acetoxybenzoic acid in the molar proportions of 10–90% of polyether-ester to 90–10% of p-acetoxybenzoic acid, so as to increase the inherent viscosity of the copolyester thus prepared to at least 0.25, measured on an 0.5% strength by weight solution in a 60–40 mixture of phenol and tetrachloroethane at 25° C.

The present invention also relates to the raw spun filaments produced from the copolyesters thus obtained, which have a modulus of elasticity equal to or greater than 1,000 g/tex, and preferably equal to or greater than 1,500 g/tex. It also relates to a process for obtaining such filaments by melt-spinning the said copolyesters at a temperature such that the copolyesters is optically anisotropic when at rest and in the relaxed state, followed by winding up the filaments in a per se known manner.

The first stage of the process for obtaining aryl polyesters according to the present invention consists or consists essentially in preparing a polyether-ester starting material from a compound of the formula (1):

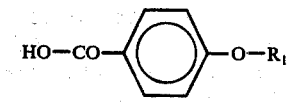

(1)

in which $R_1$ is a $-CH_2-CH_2OH$ radical or a

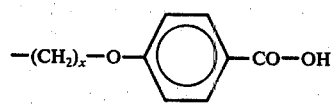

radical, with x being an integer from 2 to 6, or alkyl esters thereof wherein the alkyl group contains from 1 to 4 carbon atoms, and, if desired, an aliphatic, alicyclic or araliphatic diol, in accordance with any per se known process, for example, by direct esterification of the compounds of the formula (1) by themselves if acid-alcohols are concerned, or by reaction with an aliphatic, alicyclic or araliphatic diol in the case of diacids, or by interchange and polycondensation of an alkyl ester of a diacid with an aliphatic, alicyclic or araliphatic diol.

As the compound of the formula

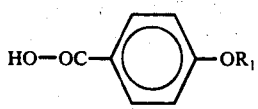

it is possible to use p- (β-hydroxyethoxy)-benzoic acid; p,p'-dicarboxy-1,2-diphenoxyethane; p,p'-dicarboxy-1,4-diphenoxybutane; p,p'-dicarboxy-1,6-diphenoxyhexane and the like. Suitable esters of these compounds are the methyl and ethyl esters and the like.

Amongst the diols which can be used to obtain the polyether-ester starting materials there may be mentioned ethylene glycol, diethylene glycol, 1,2-propylene glycol, 1,4-butanediol, 1,5-pentanediol, 1,6-hexanediol, 1,4-dimethylol-cyclohexane, or even polyoxyalkylene glycols such as, for example polyoxyethylene glycol or polytetrahydrofurane.

The said polyether-esters can optionally be prepared in the presence of per se known catalysts, depending on the precise type of reaction and on the starting reactants used.

In certain cases it may be desirable to add per se known fillers, such as antioxidants, stabilizers, delustering agents, dyestuffs, inert fillers such as silica, calcium carbonate, glass fibers, and the like.

The block-type copolyesters obtained according to the present invention are prepared from the polyether-ester obtained as described above, having an inherent viscosity of at least 0.2, and para-acetoxybenzoic acid, in the molten phase, if desired in the presence of acidolysis catalysts, for example para-toluene-sulphonic acid, dibutyl-tin oxide, cobalt carbonate, magnesium and the like.

The copolyesters thus obtained have flexible blocks originating from the polyether-ester starting material and rigid blocks originating from the para-acetoxybenzoic acid.

The block-type copolyesters obtained according to the present invention have a peculiarity of having a melting range which can be more or less wide depending in particular on the precise nature of the copolymer used and on the relative proportions of the starting compounds, namely the polyether-ester, and the para-acetoxybenzoic acid. Within this melting range, the said copolyesters have an optical anisotropy at rest and in the relaxed state.

This melting range, during which the copolyester exhibits an optical anisotropy at rest and in the relaxed state, is demonstrated by observation under the microscope, in polarised light, of a shaving of the copolyester in a silicone oil on a heated state.

The filaments according to the present invention are obtained by melt-spinning in accordance with any per se known process, at a temperature which is within the melting range, while the copolyester is optically anisotropic. After the actual spinning, the said filaments are simply wound up in the usual manner without requiring subsequent drawing, which is of extremely great value practically and economically.

The filaments thus obtained have a modulus of elasticity equal to or greater than 1,000 g/tex, and generally equal to or greater than 1,500 g/tex. The filaments may be used directly, for example as reinforcing filaments in the rubber industry, such as the industry concerned with tires, conveyor belts, transmission belts, hoses, and the like.

The examples which follow, in which the parts are to be understood as by weight, are given by way of still more fully assisting in understanding the inventive concept, but without limiting the invention.

EXAMPLE 1

A. Preparation of the polyether-ester having the recurring unit

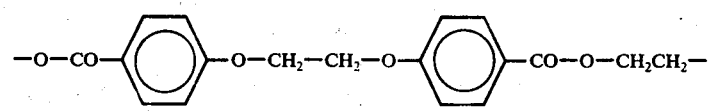

578 parts of 1,2-diphenoxyethane-p,p'-di(methyl carboxylate), 272 parts of ethylene glycol, 6.295 parts of manganese acetate, and 0.235 part of antimony oxide are introduced into a reactor.

The reactor is heated on an oil bath. The interchange starts at about 205° C, the methanol distills, and the temperature is raised to 255° C, whereupon the excess ethylene glycol distills off.

The pressure is lowered to 0.5 mm Hg in 1 hour and the mixture is polycondensed for 1 hour and 35 minutes at about 270° C.

The polymer thus obtained is run, under slight nitrogen pressure, into a bath of cold water and then dried at 60° C in vacuo and ground. It has the following characteristics:

| | |
|---|---|
| inherent viscosity | 0.622 |
| viscosity in the molten state at 290° C | 3,660 poises |
| melting point | 246° C |

B. Preparation of the block-type copolyester

The following charges are introduced into a reactor equipped with a stirrer and a distillation column: 168 parts of the poly(1,2-diphenoxyethane-p,p'-ethylene dicarboxylate) prepared as described above in A, of inherent viscosity 0.622 (40 mol %), and 135 parts of para-acetoxybenzoic acid (60 mol %), after having set up a vacuum and flushed the apparatus three times with nitrogen.

The reactants are heated in an oil bath so as to give a material temperature of about 270° C. When the temperature reaches 244° C, acetic acid distills off. The pressure is dropped to 0.3–0.5 mm Hg in 45 minutes and polycondensation is then carried out for 4 hours at 280°–294° C.

The copolyester thus obtained, run into cold water, dried for 4 hours at 110° C, and ground to a powder, has a slightly fibrillar appearance.

The copolyester has an inherent viscosity of 0.55 in a 60–40 mixture of phenol and tetrachloroethane at 25° C and its melting range is between approximately 240° C and 310° C.

The copolyester is spun in a micro-spinning apparatus under the following conditions:

| | |
|---|---|
| melting point | 250° C |
| wind-up speed | 40 m/min |
| spinneret draw ratio, i.e., $\frac{\text{speed of wind-up}}{\text{mean speed of passage through the spinneret}}$ | 44 |
| number of orifices in the spinneret | 13 |
| diameter of the orifices | 0.40 mm |
| length of the orifices | 1.6 mm |

The raw spun filaments have the following characteristics, as measured on a single strand:

| | |
|---|---|
| gauge | 26.8 dtex |
| tenacity | 18.2 g/tex |
| elongation | 1.78% |
| modulus of elasticity | 1,836 g/tex |

EXAMPLE 2

The following charges are introduced into a reactor under the same conditions as described above in Example 1 B: 123 parts of poly(1,2-diphenoxyethane-p,p'-ethylene dicarboxylate) of inherent viscosity 0.654 (25 mol %), and 202.5 parts of p-acetoxybenzoic acid (75 mol %). The acidolysis reaction starts at about 235° C. The duration of application of vacuum is 35 minutes.

The mixture is polycondensed for 4 hours at 282° C under 0.3 mm Hg. An opaque white molten copolyester is obtained which, on running out, forms fibrids. Its melting range is about 255° to 300° C.

This copolyester is spun under the following conditions:

| | |
|---|---|
| melting point | 270° C |
| wind-up speed | 100 m/minute |
| spinneret draw ratio | 87 |
| number of orifices in the spinneret | 7 |
| diameter of the orifices | 0.40 mm |
| length of the orifices | 1.6 mm |
| rate of flow | 1.15 m/minute |

The filaments thus obtained, raw from the spinning process, have the following characteristics, measured on a single strand:

| | |
|---|---|
| gauge | 14.8 dtex |
| tenacity | 12 g/tex |
| elongation | 1.01% |
| modulus of elasticity | 1,380 g/tex |

EXAMPLE 3

A. Preparation of the polyether-ester 537 (1.5 mols) of 1,4-diphenoxybutane-p,p'-di(methyl carboxylate), 233 parts of ethylene glycol (3.75 mols), 0.265 part of manganese acetate, and 0.220 part of antimony trioxide are introduced into a reactor equipped with heating and regulating devices.

The interchange commences at 183° C and the methanol distills off. The temperature is then raised to 250° C, a high vacuum (0.5 mm Hg) is set up in the course of 1 hour, and the polycondensation takes place at 265° C for 1 hour and 15 minutes.

The polymer, run into a bath of cold water, is dried in vacuo at 60° C and ground. It has an inherent viscosity of 0.567 and a melting point of 213° C.

B. Preparation of the block-type copolyester 160.2 parts of poly(1,4-diphenoxybutane-p,p'-ethylene dicarboxylate) and 189 parts of p-acetoxybenzoic acid are introduced into a reactor equipped with heating and regulating devices.

The mixture is heated and the acidolysis starts at about 244° C. The methanol distills off in 3 hours and 40 minutes. The pressure is lowered to 0.5 mm Hg in 25 minutes and the polycondensation is carried out at 270° C for 7 hours and 10 minutes. After running out the material into water and drying it, an opaque beige copolyester is obtained having 70% of units originating from p-acetoxybenzoic acid, and having an inherent viscosity of 0.49 and a melting range of from approximately 160° C to 300 ° C.

This copolyester is melt-spun under the following conditions:

| | |
|---|---|
| melt temperature | 250° C |
| wind-up speed | 115 m/minute |
| spinneret draw ratio | 120 |

The mechanical characteristics of the raw spun filaments thus obtained, as measured on a single strand, are as follows:

| | |
|---|---|
| gauge | 10.5 dtex |
| tenacity | 9.08 g/tex |
| elongation | 0.85% |
| modulus of elasticity | 1,221 g/tex |

EXAMPLE 4

A. Preparation of the polyether-ester 537 parts (1.5 mols) of 1,4-diphenoxybutane-p,p'-di(methyl carboxylate), 170 parts (1,875 mols) of 1,4-butanediol, and 0.170 part of triethanolamine orthotitanate are introduced into a reactor equipped with heating and regulating devices.

The alcohol interchange commences at 188° C. The temperature is raised to 250° C in 1 hour and 45 minutes. A high vacuum (0.5 mm Hg) is established in 30 minutes, while the temperature of the mass is raised to 260° C.

The polymer thus obtained is run out into water, dried in vacuo and ground. It has an inherent viscosity of 0.738 and a melting point of 181° C.

B. Preparation of the block-type copolymer 153.6 parts of the polyether-ester obtained as described in A (0.4 mol) and 108 parts of p-acetoxybenzoic acid (0.6 mol) are introduced simultaneously into a reactor identical to that used in A.

When the temperature of the mass reaches 215° C, the acetic acid starts to distill. The temperature is maintained at 250° C for 1 hour and 10 minutes; a vacuum of 0.5 mm Hg is then set up and a temperature of 255° C is maintained for 45 minutes.

A light beige copolyester of inherent viscosity 0.47 and melting range 170° C to 296° C is obtained.

EXAMPLE 5

A. Preparation of a polyether-ester having the recurring unit

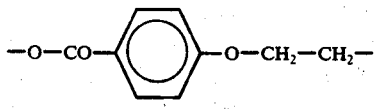

196 parts of methyl para-(2-hydroxyethyoxy)-benzoate, 62 parts of ethylene glycol, 0.100 part of manganese acetate, and 0.81 part of antimony oxide are introduced into a reactor.

The interchange is carried out at a temperature of 195° C and the mixture is then polycondensed for 4 hours at 250°–265° C under a pressure of 0.5 mm Hg and then for 6 hours at 275° C. A polymer of inherent viscosity of 0.60, measured on a solution in a 60–40 mixture of phenol and tetrachloroethane at 25° C is obtained. Melting point: 200° C.

B. Preparation of the block-type copolyester 39.4 parts of poly(ethylene p-hydroxybenzoate) and 28.8 parts of p-acetoxybenzoic acid are introduced into a reactor.

When the temperature of the mass reaches 170° C, the acetic acid starts to distill off. The temperature of the mass rises to 250° C in 35 minutes, while the mass becomes thick and opaque. The temperature increase is continued while lowering the pressure to 0.5 mm Hg in 20 minutes. Polycondensation is carried out for 4 hours at 279° C and a thick paste of light beige color, having an inherent viscosity of 0.25, is obtained. Melting range: from 130° C onwards, up to above 300° C.

What is claimed is:

1. Spinnable and moldable block-type copolyesters, characterized in that they consist essentially of:
   from 10 to 90% of recurring flexible units of the formula

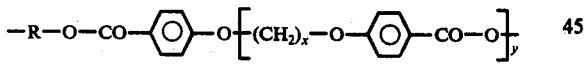

in which R is an aliphatic, alicyclic or araliphatic radical, x is an integer from 2 to 6, inclusive, and y is 0 or 1, and
   from 90 to 10% of recurring rigid units of the formula

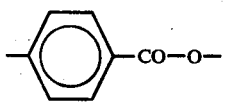

the copolyesters having an inherent viscosity of at least 0.25, measured on an 0.5% strength by weight solution in a 60/40 mixture of phenol and tetrachloroethane at 25° C.

2. Spinnable and moldable block-type copolyesters according to claim 1, characterized in that they consist essentially of:
   from 40 to 80% of recurring flexible units of the formula

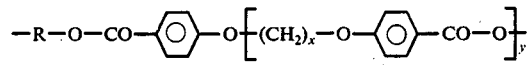

in which R is an aliphatic, alicyclic or araliphatic radical, x is an integer from 2 to 6, inclusive and y is 0 or 1, and
   from 20 to 60% of recurring rigid units of the formula

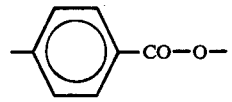

the copolyesters having an inherent viscosity of at least 0.25, measured on an 0.5% strength by weight solution in a 60/40 mixture of phenol and tetrachloroethane at 25° C.

3. Spinnable and moldable block-type copolyesters according to claim 1, characterized in that they consist essentially of:
   from 10 to 90% of recurring flexible units of the formula

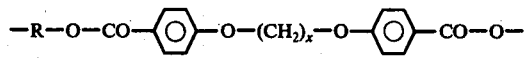

in which R is an aliphatic, alicyclic or araliphatic radical, and x is an even number from 2 to 6 inclusive, and
   from 90 to 10% of recurring rigid units of the formula

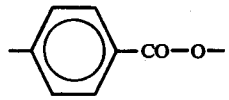

the copolyesters having an inherent viscosity of at least 0.25, measured on an 0.5% strength by weight solution in a 60/40 mixture of phenol and tetrachloroethane at 25° C.

4. Spinnable and moldable block-type copolyesters according to claim 1, characterized in that they consist essentially of:
   from 10 to 90% of recurring flexible units of the formula

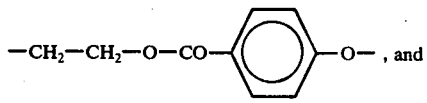

from 90 to 10% of recurring rigid units of the formula

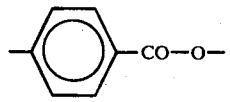

having an inherent viscosity of at least 0.25, measured on an 0.5% strength by weight solution in a 60/40 mixture of phenol and tetrachloroethane at 25° C.

5. A process for obtaining block-type copolyesters as defined in claim 1, characterized in that:

a. first, a polyether-ester is prepared which has a recurring unit of the formula

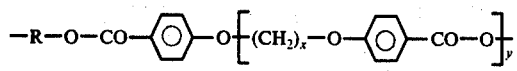

in which R is an aliphatic, alicyclic or araliphatic radical, $x$ is an integer from 2 to 6, and $y$ is 0 or 1, by reaction of a compound of the formula (1):

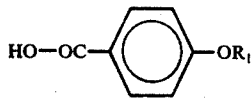

in which $R_1$ is a —CH$_2$—CH$_2$—OH group, or a

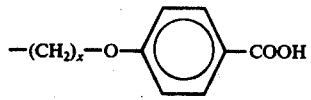

group, $x$ having the value given above, or lower alkyl esters thereof and, if desired, an aliphatic, alicyclic or araliphatic diol, the said polyether-ester having an inherent viscosity of at least 0.2, and b. the polyether-ester thus obtained is reacted, in the molten phase, with para-acetoxybenzoic acid in the molar proportions of 10–90% of polyether-ester to 90–10% of para-acetoxybenzoic acid, so as to increase the inherent viscosity of the copolymer thus prepared to at least 0.25, measured under the conditions indicated in claim 1.

6. Raw spun filaments produced from a copolyester as defined in claim 1, characterized in that they possess a modulus of elasticity equal to or greater than 1,000 g/tex.

7. Raw spun filaments as defined in claim 6, the modulus of elasticity of which is equal to or greater than 1,500 g/tex.

8. A process for obtaining raw spun filaments as defined in claim 6, characterized in that a copolyester as defined in claim 1 is melt-spun at a temperature such that the copolyester is optically anisotropic at rest and in the relaxed state, and the filaments thus obtained are then collected.

* * * * *